US008533539B2

(12) United States Patent
Marathe et al.

(10) Patent No.: US 8,533,539 B2
(45) Date of Patent: Sep. 10, 2013

(54) FAULT HANDLING SYSTEMS AND METHODS

(75) Inventors: Shailesh Marathe, Pune (IN); Rajesh Chepuri, Pune (IN)

(73) Assignee: Symantec Corporation, Mountain View, CA (US)

( * ) Notice: Subject to any disclaimer, the term of this patent is extended or adjusted under 35 U.S.C. 154(b) by 407 days.

(21) Appl. No.: 12/885,418

(22) Filed: Sep. 17, 2010

(65) Prior Publication Data

US 2012/0072766 A1    Mar. 22, 2012

(51) Int. Cl.
*G06F 11/00*    (2006.01)
(52) U.S. Cl.
USPC .............. 714/48; 714/6.21; 714/6.23; 714/42
(58) Field of Classification Search
USPC .................... 714/6.1, 6.2, 6.21, 6.23, 6.3, 42, 714/43, 48, 54, 56
See application file for complete search history.

(56) References Cited

U.S. PATENT DOCUMENTS

| | | | | |
|---|---|---|---|---|
| 6,681,339 | B2* | 1/2004 | McKean et al. ................. | 714/6.2 |
| 7,120,824 | B2* | 10/2006 | Burton et al. .................. | 714/6.23 |
| 7,546,429 | B1* | 6/2009 | Kiselev et al. ................ | 714/6.23 |
| 2006/0031709 | A1* | 2/2006 | Hiraiwa et al. .................... | 714/5 |
| 2006/0112304 | A1 | 5/2006 | Subramanian et al. | |
| 2009/0006890 | A1 | 1/2009 | Takada et al. | |
| 2009/0271582 | A1* | 10/2009 | Ninose ........................... | 711/162 |
| 2009/0290249 | A1 | 11/2009 | Makino et al. | |
| 2011/0219261 | A1* | 9/2011 | Bartlett et al. ................ | 714/6.23 |

OTHER PUBLICATIONS

Florian Haas et al: "The DRBD User's Guide", Oct. 15, 2009, pp. I-VIII, 1-161, XP55010737, Retrieved from the Internet: URL: http://www.linbit.com/en/education/tech-guides/drbd-user-s-guide/ [retrieved on Oct. 28, 2011] p. 2, paragraph 1 Sections 2.3 and 2.5; p. 5 p. 7 Section 2.8; p. 8-p. 9 Sections 2.10 and 2.11; p. 10 Sections 6.1.3-6.2.2; p. 31-p. 34 Section 6.9; p. 38-p. 39 Section 6.13; p. 43-p. 45 Chapter 7; p. 49-p. 52.
Patent Cooperation Treaty (PCT) International Search Report; (PCT Article 18 and Rules 43 and 44) and Written Opinion of the International Searching Authority (PCT Rule 43bis.1); International Application No. PCT/US2011/052025; International Filing Date: Sep. 16, 2011; Date of Mailing: Nov. 7, 2011 pp. 1-12.
Veritas Volume Replicator Administrator's Guide; Solaris; 5.0 Maintenance Pack 3; pp. 1-478; 2008.
Veritas Volume Manager Administrator's Guide; Solaris; 5.0 Maintenance Pack 3; pp. 1-679; 2008.

* cited by examiner

*Primary Examiner* — Joseph D Manoskey
(74) *Attorney, Agent, or Firm* — Wilmer Cutler Pickering Hale and Dorr LLP

(57) ABSTRACT

Systems and methods for fault handling are presented. In one embodiment, a fault handling method includes: performing an error type detection process including determining if an error is a media error or a connectivity error; performing a detachment determination process to establish an appropriate detachment scenario, wherein the appropriate detachment scenario includes not detaching any mirrors if the connectivity error involves all mirrors; and returning an application write with a failure. In one embodiment, the detachment determination process detaches a mirror in accordance with results of a read-write-back process. In one exemplary implementation, the detachment determination process includes a connectivity status inquiry and mirrors are detached in accordance with results of the connectivity status inquiry. In one exemplary implementation, the connectivity status inquiry includes a SCSI connectivity inquiry. In one embodiment, consistency and synchronization is maintained between the mirrors by utilizing a read-write-back operation.

24 Claims, 18 Drawing Sheets

300A

320A
Sending a message to other nodes in the cluster to correct the mirror inconsistency.

330A
Performing a read-write-back process in which the other nodes in the cluster attempt to correct the mirror inconsistency by reading from the specified mirror at the specified address range and writing to the other mirrors.

340A
Communicating back the results of the correction operation to the control or initiating node along with any failures seen during the correction operation.

320B
A connectivity inquiry process is performed.

330B
Sending a message to a designated node in the cluster to correct a mirror inconsistency.

340B
Performing a read-write-back process by the designated node to correct the mirror inconsistency by reading from the specified mirror at the specified address range and writing to the other mirrors.

421
Determining mirrors involved in a media error.

---

422
If all mirrors have encountered media errors then all but one of the mirrors is detached.

---

423
If a subset of mirrors have encountered a media error then the mirrors in the subset are detached.

431
Receiving consistency maintenance result information.

432
Performing a connectivity error mirror involvement process.

433
Performing a detachment scenario process based upon the results of the connectivity error mirror involvement process.

491
If all mirrors are involved in a connectivity error no mirrors are detached.

492
If a subset of mirrors are involved in a connectivity error with respect to all nodes, the subset of mirrors are detached.

493
A special subset of all but one mirror is detached.

494
If a mirror is involved in a connectivity error with respect to a majority of the nodes, the mirror is detached.

510
If at least one node returns a success no mirrors are detached.

520
If all nodes return an error for a subset of mirrors then those mirrors in the subset are detached.

530
If all nodes report a failure the read-write-back protocol is rerun using a different mirror to read from.

540
If read-write-back results indicate a mirror is not accessible to any of the nodes the mirror can be detached.

550
If nodes have a disjoint set of accessible mirrors, the set of mirrors that are not accessible can also be detached.

| 810 Error detection module. |
| 815 Consistency maintenance module. |
| 820 Detachment determination module. |
| 830 Reporting module. |

FIG 8

FAULT HANDLING SYSTEMS AND METHODS

FIELD OF THE INVENTION

The present embodiments relate to the field of information storage and fault handling.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Maintaining and tracking the information is often very important for a variety or reasons.

A number of storage architectures include storage mirrors that can be utilized for various purposes (e.g., recovery, corruption correction, etc.). Typically, mirrors in a volume should have same data to maintain consistency for reads across the mirrors. When mirrors are implemented at a software layer and the volume is shared across multiple nodes in a shared storage cluster, localized connectivity errors leading to complete loss of storage connectivity from one or more nodes can trigger I/O errors for writes. If the connectivity loss happens while a write is in progress it could make data across mirrors inconsistent. In such scenarios, conventional approaches usually mark all but the last mirror as detached to prevent inconsistency for data reads from un-affected nodes. However, this traditional approach of detachment typically reduces redundancy of mirrors without providing any additional benefit to the affected nodes.

SUMMARY

Systems and methods for fault handling are presented. In one embodiment, a fault handling method includes: performing an error type detection process including determining if an error is a media or connectivity error; performing a detachment determination process to establish an appropriate detachment scenario, wherein the appropriate detachment scenario includes not detaching any mirrors if the connectivity error involves all mirrors; and returning an application write with a failure. In one embodiment, the detachment determination process detaches a mirror in accordance with results of a read-write-back process. In one exemplary implementation, the detachment determination process includes a connectivity status inquiry and mirrors are detached in accordance with results of the connectivity status inquiry. In one exemplary implementation, the connectivity status inquiry includes a SCSI connectivity inquiry. In one embodiment, consistency and synchronization is maintained between the mirrors by utilizing a read-write-back operation. Mirrors not accessible to a majority of nodes can also be detached.

In one embodiment, performing the error type detection process includes analyzing if the error involves a subset or all of the mirrors, and if the error involves all of the mirrors determining if any of the mirrors have encountered a media error. In one exemplary implementation, performing a detachment determination process includes identifying for detachment: mirrors in a subset of mirrors that have encountered a media error; and all but one of the mirrors if all of the mirrors have encountered media errors. A role from a first node can be transferred to a second node, wherein the first node is impacted by loss of storage access and the second node has sufficient storage access.

In one embodiment, a computer readable storage medium has stored thereon, computer executable instructions that, when executed by a computer system cause the computer system to perform a method. In one embodiment, the method includes: performing an error type detection process including determining if an error is a media or connectivity error; performing a detachment determination process to establish an appropriate detachment scenario, wherein the appropriate detachment scenario includes not detaching any mirrors if the connectivity error involves all mirrors; and returning an application write with a failure. In one embodiment, the detachment determination process detaches a mirror in accordance with results of a read-write-back process. In one embodiment, the detachment determination process detaches a mirror in accordance with results of read-write-back process. In one exemplary implementation, the detachment determination process includes a connectivity status inquiry and mirrors are detached in accordance with results of the connectivity status inquiry. In one exemplary implementation, the connectivity status inquiry includes a SCSI connectivity inquiry. In one embodiment, consistency and synchronization is maintained between the mirrors by utilizing a read-write-back operation. Mirrors not accessible to a majority of nodes can also be detached. A role from a first node can be transferred to a second node, wherein the first node is impacted by loss of storage access and the second node has sufficient storage access.

In one exemplary implementation, a computer system has a processor coupled to a computer readable storage media and the computer system executes computer readable code which causes the computer system to perform operations including: performing an error type detection process including determining if an error is a media or connectivity error; performing a detachment determination process to establish an appropriate detachment scenario, wherein the appropriate detachment scenario includes not detaching any mirrors if the connectivity error involves all mirrors; and returning an application write with a failure. In one embodiment, the detachment determination process detaches a mirror in accordance with results of read-write-back process. In one embodiment, the detachment determination process detaches a mirror in accordance with results of a read-write-back process. In one exemplary implementation, the detachment determination process includes a connectivity status inquiry and mirrors are detached in accordance with results of the connectivity status inquiry. In one exemplary implementation, the connectivity status inquiry includes a SCSI connectivity inquiry. In one embodiment, consistency and synchronization is maintained between the mirrors by utilizing a read-write-back operation. Mirrors not accessible to a majority of nodes can also be detached. A role from a first node can be transferred to a second node, wherein the first node is impacted by loss of storage access and the second node has sufficient storage access.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 3A is a block diagram of an exemplary all node read-write-back consistency maintenance process in accordance with one embodiment of the present invention.

FIG. 3B is block diagram of an exemplary initial connectivity inquiry consistency maintenance process in accordance with one embodiment of the present invention.

FIG. 4B is a block diagram of exemplary media error detachment configuration process in accordance with one embodiment of the present invention.

FIG. 4C is a block diagram of an exemplary connectivity error detachment configuration determination process in accordance with one embodiment of the present invention.

FIG. 4D is a block diagram of an exemplary detachment scenario process in accordance with one embodiment of the present invention.

FIG. 5 is a flow chart of an exemplary connectivity error detachment configuration process in accordance with one embodiment of the present invention.

FIG. 8 is a block diagram of an exemplary fault correction module in accordance with one embodiment of the present invention.

DETAILED DESCRIPTION

Figure 1A:
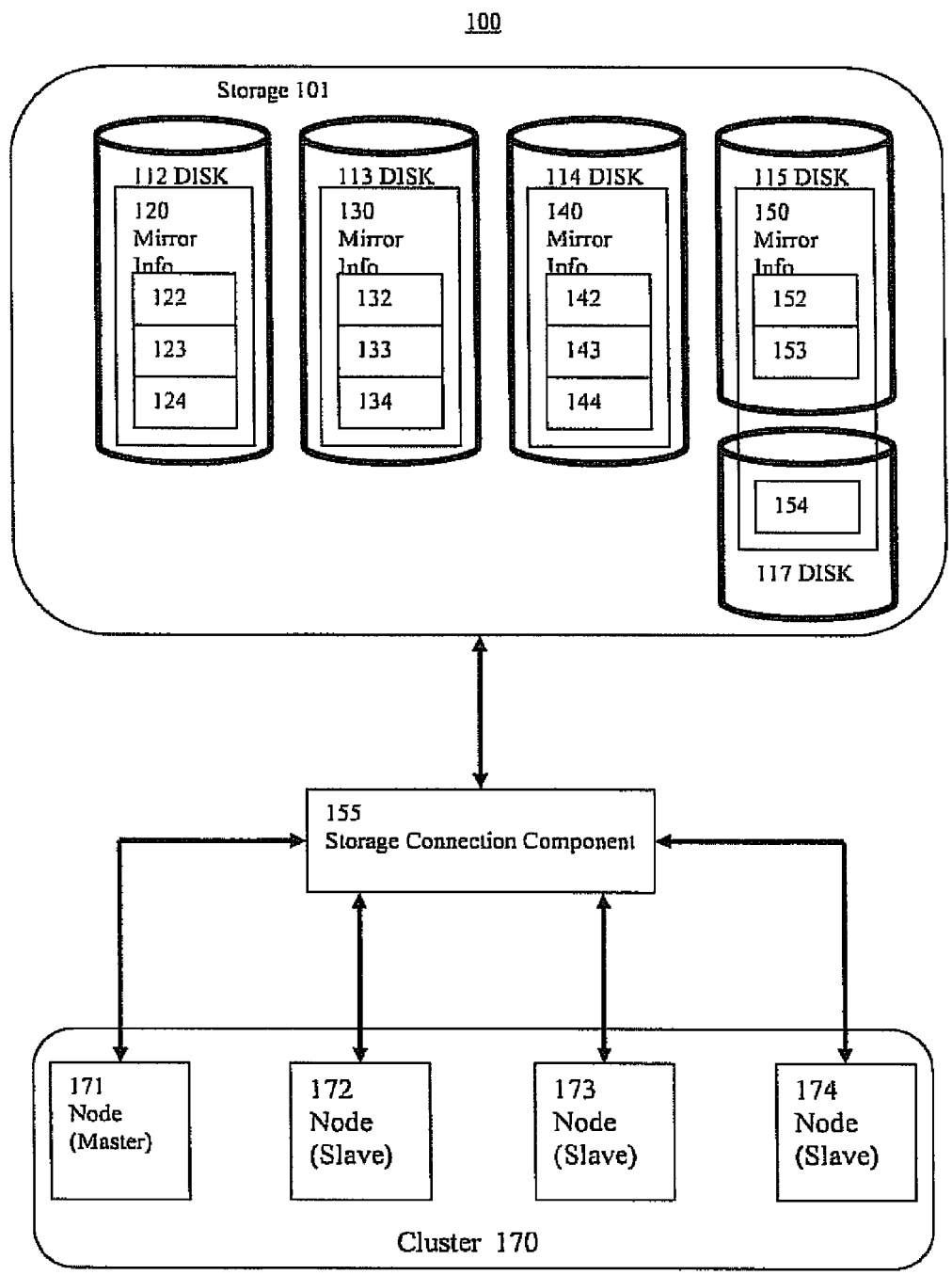
FIG. 1A is a block diagram of an exemplary data storage system in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present new systems and methods facilitate efficient and effective information storage management and fault handling. The systems and methods facilitate effective management of I/O error impacts on data storage resources and can compliment existing infrastructures. For example, present system and methods can facilitate robust maintenance of mirror resources with reduced inappropriate detachment when handling local storage connectivity issues. In one embodiment, a detachment determination process engages in an appropriate detachment scenario, wherein the appropriate detachment scenario includes not detaching any mirrors if a connectivity error involves all of the mirrors. The new systems and methods include improved avoidance of mirror detachment associated with loss of complete storage connectivity from one or more nodes while facilitating consistency and synchronization between mirrors. The new approach includes an alternate method to handle previous scenarios in which unnecessary detachments that do not provide any benefit for affected nodes by detaching all but a last mirror in complete local connectivity failures.

In one embodiment, present systems and methods are implemented in a cluster environment. The systems and methods can facilitate recovery of failed I/Os from nodes which have access to other mirrors and by returning failure for I/Os from the affected nodes in a shared storage cluster. The system and methods can facilitate improved handling of local faults impacting mirrors of a device in shared storage clusters. Shared storage cluster management (e.g., CFS/CVM, etc.) is very important in the market place and is becoming more important as systems start to support higher number of nodes in a CFS/CVM cluster. Mirror redundancy is a key aspect of many shared storage clusters and avoidance of unnecessary detachment of mirror resources and maintenance of consistency and synchronization is helpful in cluster management. It is appreciated that the new methods can be applied to devices with RAID1 configurations or configurations involving other combinations of RAID1.

FIG. 1A is a block diagram of exemplary data storage system 100 in accordance with one embodiment of the present invention. Data storage system 100 includes storage resource 101, storage connection component 155 and cluster 170. Storage resource 101 includes disks 112, 113, 114, 115 and 177 that store mirror information. Mirror information 120 includes data 122, 123, and 124 stored on disk 112. Mirror information 130 includes data 132, 133, and 134 stored on disk 113. Mirror information 140 includes data 142, 143, and 144 stored on disk 114. Mirror information 150 includes data 152 and 153 stored on disk 115 and data 154 stored on disk 117. Cluster 170 includes nodes 171, 172, 173, and 174. In one embodiment, a mirror is implemented in a virtual level and the mirror volume is shared across multiple nodes (e.g., in a shared cluster, in cluster 170, etc.).

The components of exemplary data storage system 100 cooperatively operate to facilitate efficient and convenient storage of data information. Disks 112, 113, 114, 115, and 117 store information. In one embodiment, the information is stored in a mirror configuration. In one exemplary implementation, information stored on one mirror is duplicated or "mirrored" on the other mirrors. In one exemplary implementation, mirror information 120 is the same as respective information 130, 140, and 150. Storage connection component 155 provides a connection between nodes cluster 170 and storage resources 101. In one embodiment, storage connection component 155 includes a storage array network (SAN) switch. Nodes 171, 172, 173 and 174 operate as hosts.

It is appreciated that the present systems and methods are readily configurable for implementation in a variety of arrangements or organization. A mirror can utilize resources on multiple disks. For example, mirror information 150 can utilize storage resources on disk 115 and disk 117. It is also appreciated that disk resources can be utilized by multiple mirrors. In one embodiment, blocks of storage resources on a disk can be assigned to one mirror and other blocks of storage resources on the same disk can be assigned to another mirror.

In one exemplary implementation, if information is being written from an application to a first mirror (e.g., mirror information 130) and one of the other mirrors is not able to store (e.g., due to a connectivity loss, etc.) the corresponding information (e.g., mirror information 140), data storage system 100 begins to handle or adjust for the fault or I/O error. The system determines whether the I/O error is due to a storage media failure or is the result of another error (e.g., loss of connectivity, etc.). If the error is not associated with a storage media failure, the system examines which mirrors are involved in an I/O error. If one or more mirrors are involved in the I/O error, the mirror can be detached as long as there is still another mirror available. However, if all the mirrors are involved in the I/O error no mirrors are detached. No mirrors are detached because if all mirrors were detached the system would fail for an application because there would be no remaining mirrors to read or write to.

In one embodiment, the system engages in a fault handling method. The fault handling method utilizes a detachment determination process. In one embodiment, the detachment determination process includes read-write-back processes by all nodes and the detachment is based upon the results of the read-write-back processes. In an alternate embodiment, the detachment determination process includes a connectivity status inquiry and the detachment is based upon the results of the connectivity status inquiry. The connectivity status inquiry results are also utilized to select a designated single node for a read-write-back process. In either scenario, the read-write back processes are utilized to facilitate consistency or synchronization correction. For example, the read-write-back operations are utilized to ensure the content of blocks 122, 123 and 124 are mirrored on blocks, 132, 133 and 134, blocks 142, 143, and 144, and blocks 152, 153 and 154 respectively. Additional information on fault handling methods and examples of mirror synchronization is provided in following sections.

Figure 1B:
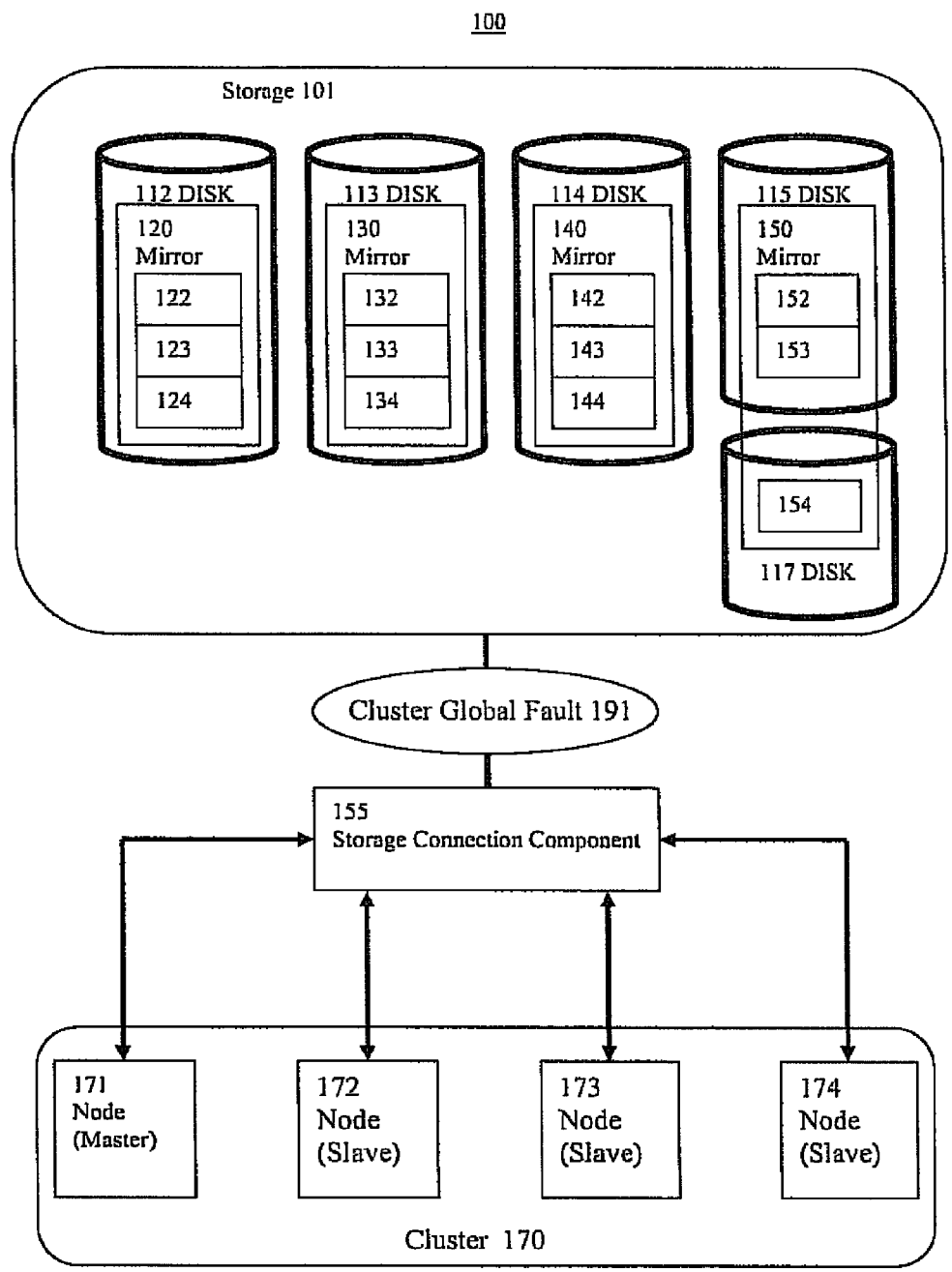
FIG. 1B is a block diagram of an exemplary data storage system with a cluster global fault between the storage connection component and storage resources in accordance with one embodiment of the present invention.

It is appreciated that there are a variety of possible fault or error scenarios. FIG. 1B is a block diagram of exemplary data storage system 100 with a cluster global fault 191 between the storage connection component 155 and storage resources 101 in accordance with one embodiment of the present invention. In FIG. 1B, the scenario involves one or more nodes losing connectivity to all mirrors. Since the connectivity error involves all mirrors none of the mirrors are detached.

Figure 1C:
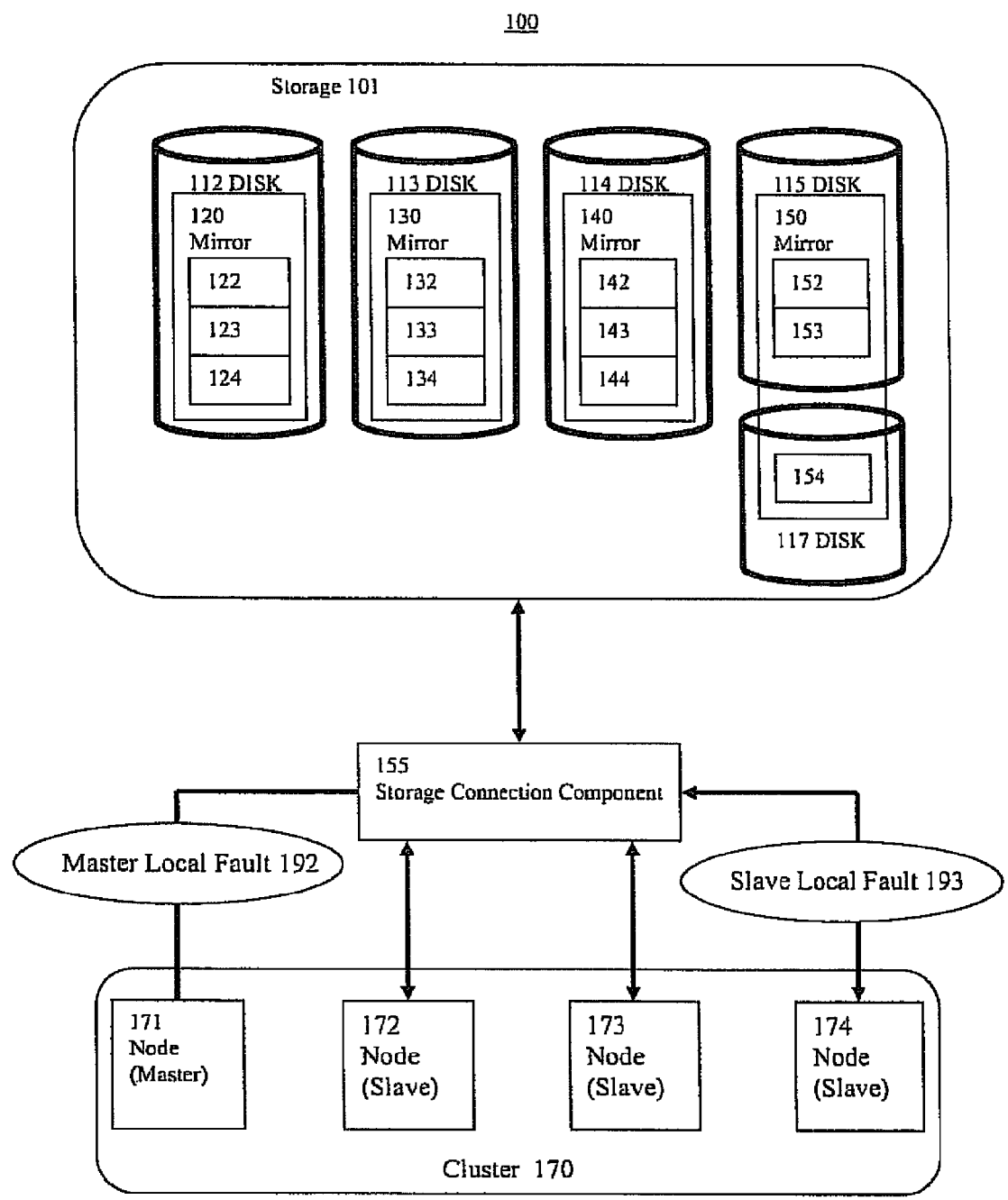
FIG. 1C is a block diagram of an exemplary data storage system with a master local fault and slave local fault in accordance with one embodiment of the present invention.

FIG. 1C is a block diagram of exemplary data storage system 100 with a master local fault 192 and slave local fault 193 in accordance with one embodiment of the present invention. Master local fault 192 causes errors or faults between master node 171 and all disks in storage resource 101 and thus causes an error to all mirrors in storage 101. Slave local fault 193 causes errors or faults between slave node 193 and all disks in storage resource 101 and thus causes an error to all mirrors in storage 101. In these scenarios no mirrors are detached.

In one embodiment, a role from a first node can be transferred to a second node, wherein the first node is impacted by loss of storage access and the second node has sufficient storage access. In one exemplary implementation, when master node 171 encounters master local fault 192 and loses connectivity the role of master can be transferred to node 172 which still has sufficient storage access storage resource 101. After the master role transfer node 172 would be a master and node 171 would be a slave. In one embodiment, the transfer or assignment of roles can be based upon various metrics. The metrics can be related to the characteristics of the nodes involved and their access to storage. In one exemplary implementation, the transfer is based upon a node having maximum access to storage. The connectivity characteristics can be based upon a weighted consideration or connectivity metric.

Figure 1D:
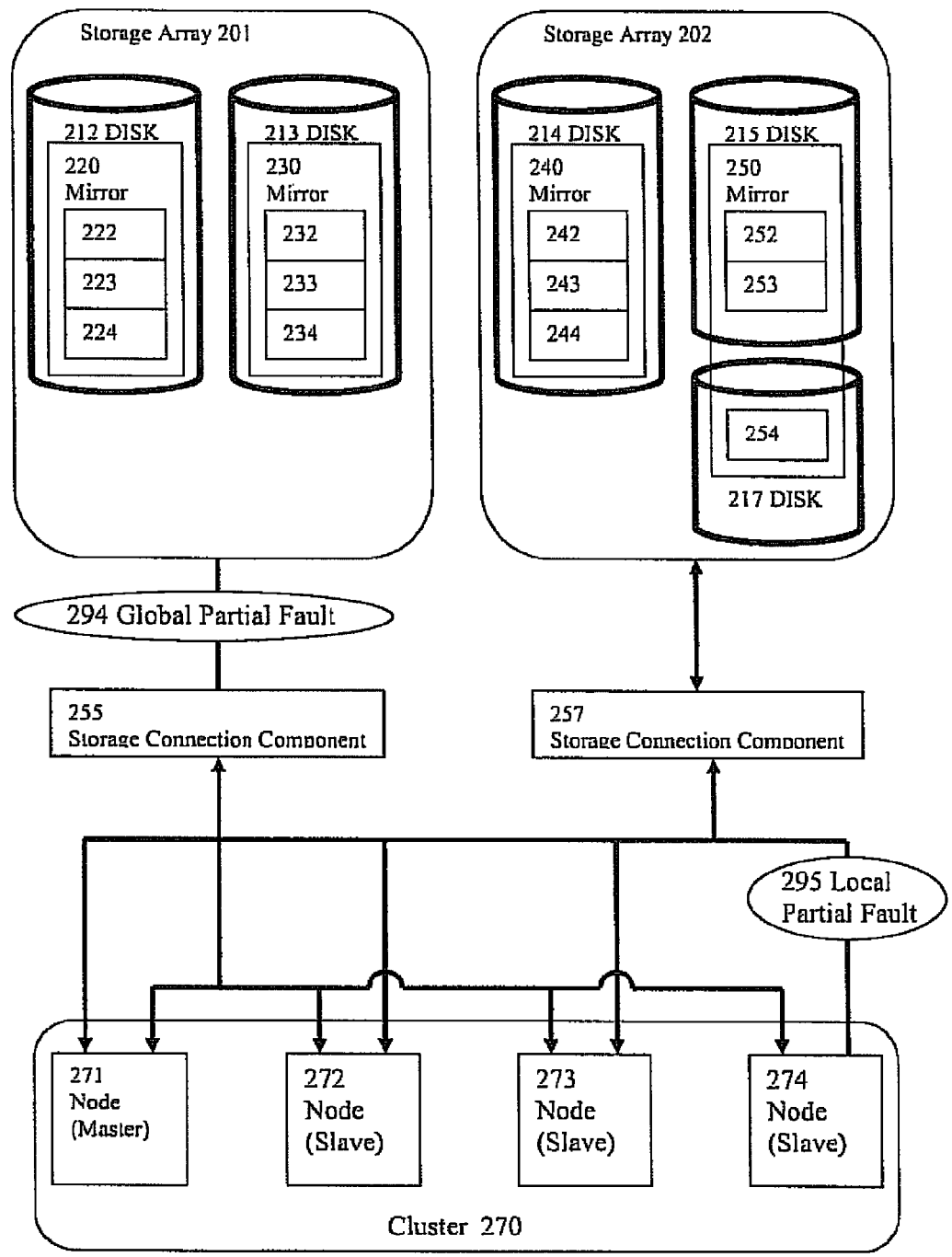
FIG. 1D is a block diagram of an exemplary data storage system with a global partial fault and local partial fault in accordance with one embodiment of the present invention.

FIG. 1D is a block diagram of exemplary data storage system 200 with a global partial fault 295 and local partial fault 295 in accordance with one embodiment of the present invention. Data storage system 200 includes data storage array 201, data storage array 202, storage connection component 255 storage connection component 257 and cluster 270. Storage array 201 includes disks 212 and 213. Storage array 202 includes disks 214, 215 and 277. The disks store mirror information. Mirror information 220 includes data 222, 223, and 224 stored on disk 212. Mirror information 230 includes data 232, 233, and 234 stored on disk 213. Mirror information 240 includes data 242, 243, and 244 stored on disk 214. Mirror information 250 includes data 252 and 253 stored on disk 215 and data 254 stored on disk 217. Cluster 270 includes nodes 271, 272, 273, and 274. In one embodiment, a mirror is implemented in a virtual level and the mirror volume is shared across multiple nodes (e.g., in a shared cluster, in cluster 270, etc.). Global partial fault 294 causes errors or faults for less than all the disks, but those errors are considered global because the are experienced by all the nodes. For example, global partial fault 294 causes faults between the disks on storage array 201 and all the nodes in the cluster 270 but does not cause faults between the disks on storage array 202 and nodes in cluster 270. Local partial fault 295 causes errors or faults for less than all the disks. For example, local partial fault 295 causes faults between the node 274 and storage array 202 but does not cause faults between the disks on storage array 201 and node 274.

In one embodiment, a subset of mirrors that are involved in the errors are detached. For example, an I/O on node 271 would encounter an error with respect to storage array 201 but not storage node 202 so the subset of mirrors associated with storage array 201 would be detached but not the subset of mirrors associated with storage array 202. However, errors associated with an I/O on node 274 do not trigger a detachment because node 274 loses connectivity to all mirrors and so none are detached. For example, node 274 loses connectivity to storage array 201 due to global partial fault 294 and loses connectivity to storage array 202 due to local partial fault 295.

Figure 1E:
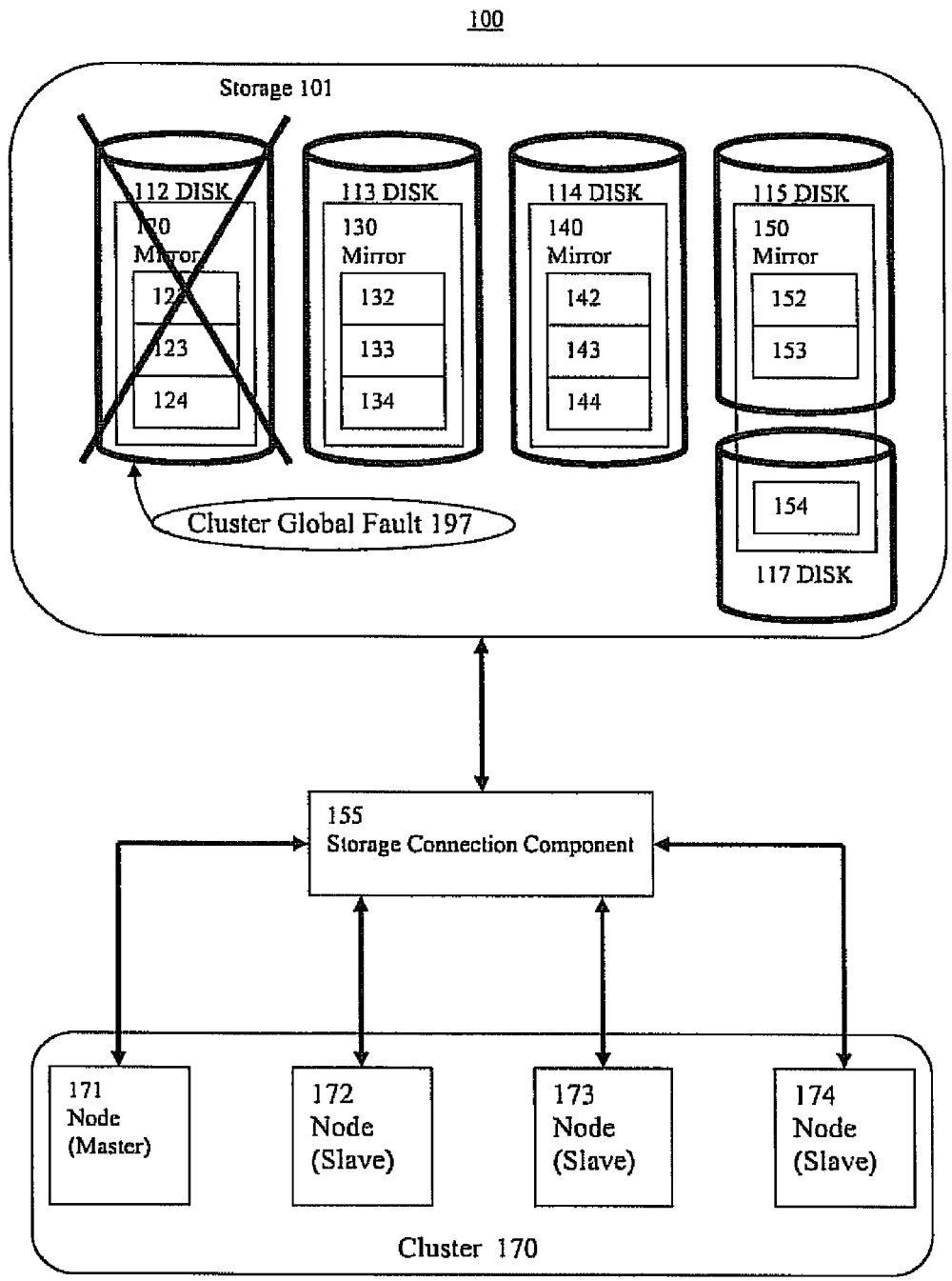
FIG. 1E is a block diagram of an exemplary data storage system with a cluster global fault in accordance with one embodiment of the present invention.

FIG. 1E is a block diagram of exemplary data storage system 100 with a cluster global fault 197 in accordance with one embodiment of the present invention. In one embodiment, cluster global fault 197 is the result of a media fault on disk 112. Cluster global fault 197 causes errors or faults between disk 112 and all nodes. In one embodiment, if a media error occurs the mirror detachment process is exited. In an alternate embodiment, when a media error occurs a mirror detachment process proceeds based upon the set of mirrors (e.g., all mirrors, a subset of mirrors, etc.) that encounter the media error. In one exemplary implementation, if all mirrors encounter a media error then all but one of the mirrors is detached and if a subset of mirrors encounter a media error the subset of mirrors is detached.

Figure 2:
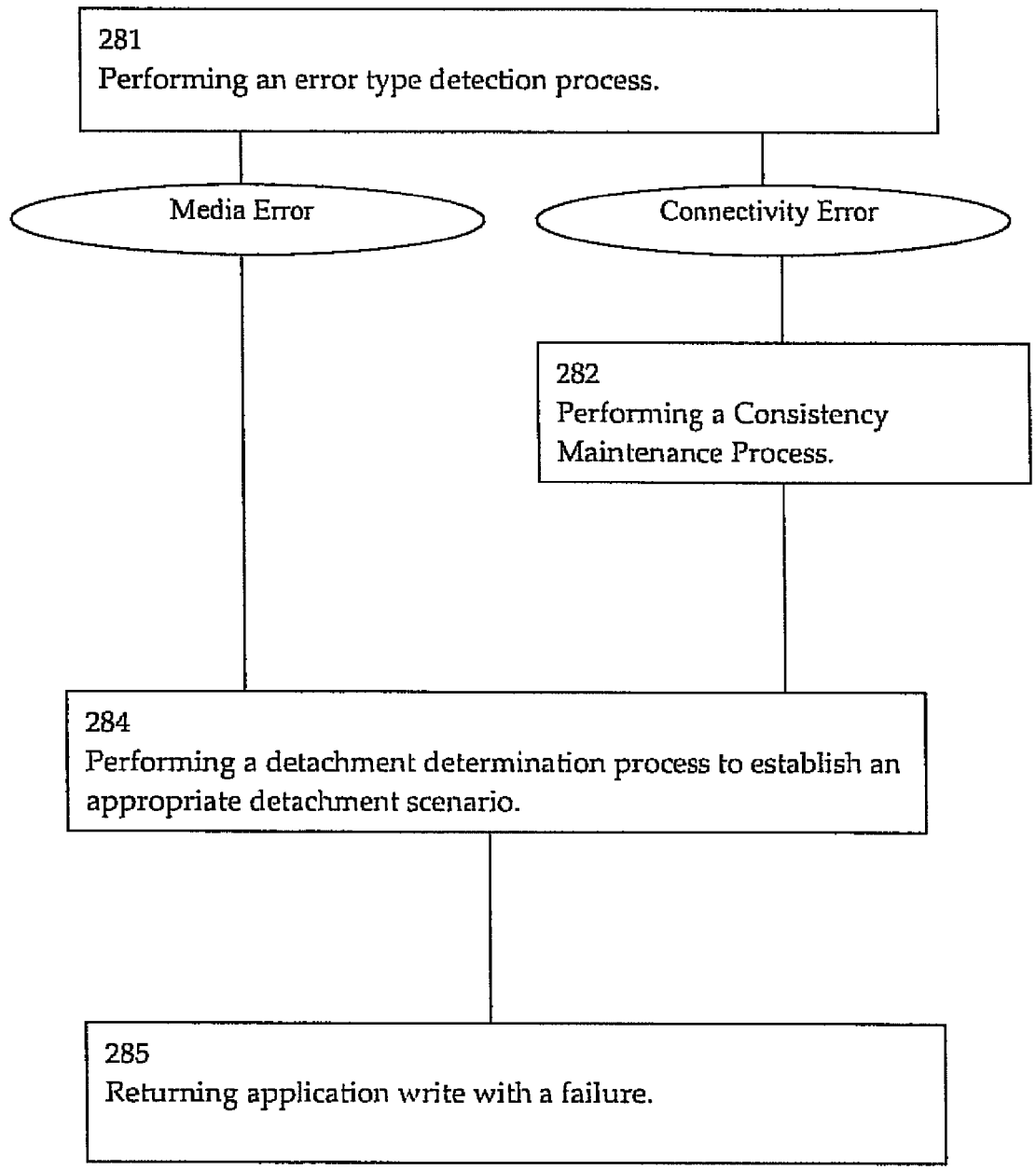
FIG. 2 is a block diagram of an exemplary fault handling method in accordance with one embodiment of the present invention.

FIG. 2 is a block diagram of a fault handling method 280 in accordance with one embodiment of the present invention. In one embodiment, fault handling method 280 facilitates maintenance of mirror resources with reduced inappropriate detachment while correcting mirror synchronization when handling local storage connectivity issues. Fault handling method 280 can facilitate improved handling of local faults impacting mirrors of a device in shared storage clusters.

In block 281, an error type detection process is performed. In one embodiment, performing an error type detection process includes determining if an error is a media error or a connectivity error. An error indication (e.g., an input/output (I/O) error indication, etc.) is received. The I/O error indication can be in response to a loss of connectivity during an attempted application write. Examination of whether the I/O error is due to a media failure is performed. In one embodiment, determining if the I/O error is a media error includes checking the I/O status. In one exemplary implementation, an analysis is made if an error involves all or a subset of the mirrors, and if the error involves all of the mirrors if any of the mirrors have encountered a media error. Error codes can be checked to determine if media errors are involved. In one embodiment, if the error is due to a media failure an I/O failure is returned to the application and the detachment process is exited. In an alternate embodiment, if the results indicate the error is a media error the process proceeds to detachment determination block 284. If the results indicate the error is a connectivity error the process proceeds to consistency maintenance block 282 before detachment determination block 284.

In block 282, a consistency maintenance process is performed. The consistency maintenance process is performed since the write operation could have created inconsistency amongst the mirrors. A read-write-back operation can be utilized to synchronize the mirrors. In a first embodiment, an all node read-write-back consistency maintenance process is utilized. In a second embodiment, an initial connectivity inquiry consistency maintenance process is utilized. In the first embodiment, all nodes perform read-write-back operations and in the second embodiment a dedicated node selected based upon the initial connectivity inquiry performs read-write-back operations. Following sections include additional description of consistency maintenance processes. Indications of connectivity based upon successes and failures results of the all node read-write-back consistency maintenance process or based upon the connectivity indication results of the initial connectivity inquiry consistency maintenance process are forwarded for utilization in determining mirrors for detachment.

In block 284, a detachment determination process is performed to establish an appropriate detachment scenario. In one embodiment, the detachment determination process can include a media error detachment configuration process based upon mirrors that encounter a media error. In one embodiment, the detachment determination process can include a connectivity error detachment configuration process based upon mirror involvement in a connectivity error. In one embodiment, determining mirror involvement in a connectivity error is based upon results of a consistency maintenance process performed in block 282. It is appreciated there are various appropriate detachment scenarios depending upon indications of mirror involvement in a connectivity error. The appropriate detachment scenario can include not detaching any mirrors if the connectivity error involves all of the mirrors, detaching a subset of mirrors involved in a connectivity error, detaching a mirror involved in a connectivity error if there is still at least some mirror redundancy available, etc. Additional explanation of detachment determination processes and appropriate detachment scenarios are set forth in following sections.

In block 285 an application write is returned with a failure. In one exemplary implementation, an application is able to handle the failure after the detachment and consistency correction because the application is expecting the entire I/O to be written, a portion of the I/O to be written or none of the I/O to be written and can accommodate these scenarios.

FIG. 3A is a block diagram of an exemplary all node read-write-back consistency maintenance process 300A in accordance with one embodiment of the present invention. In one embodiment, the results of the all node read-write-back consistency maintenance process 300A in addition to facilitating maintenance of mirror consistency also provide an indication of an appropriate detachment scenario.

In block 320A a message is sent to other nodes in the cluster to correct a mirror inconsistency. In one embodiment, an initiation or control node sends the message to correct the mirror inconsistency to all the other nodes in the cluster. The control or initiation node also specifies in the message the impacted address range of the device and the mirror which should be used to correct the inconsistency. It is appreciated the specified mirror can be selected in a variety of ways (e.g., randomly, based upon results of a connectivity inquiry, etc.).

In block 330A a read-write-back process is performed in which the other nodes in the cluster attempt to correct the mirror inconsistency by reading from the specified mirror at the specified address range and writing to the other mirrors. In one embodiment, the results of the read-write-back operations are forwarded back to the initiating or control node along with indications of operation results (e.g., failure, success, etc.). If all the nodes report a failure, the read-write-back protocol can be rerun using a different designated mirror to read from. For example, a read-write-back process is repeated utilizing a second specified mirror if there is a failure response to a read-write-back process utilizing a first specified mirror. The second mirror can be selected in accordance with a variety of mechanisms (e.g., randomly, based upon connectivity inquiry results, etc.).

In block 340A, the results of the correction operation are communicated back to the control or initiating node along with any failures seen during the correction operation. In one embodiment, the results are utilized by the control or initiating node to determine mirrors involved in a connectivity error. In one embodiment, results of exemplary all node read-write-back consistency maintenance process 300A can be utilized in a detachment determination process (e.g., similar to block 284, etc.). In one embodiment, a detachment determination process utilizes the all node read-write-back consistency maintenance processes results to determine mirror involvement in errors. Following sections include additional detailed description of detachment determination processes.

FIG. 3B is block diagram of initial connectivity inquiry consistency maintenance process 300B in accordance with one embodiment of the present invention. In one embodiment, the results of the initial connectivity inquiry consistency maintenance process 300B in addition to facilitating maintenance of mirror consistency also provide an indication of an appropriate detachment scenario.

In block 320B, a connectivity inquiry process is performed. In one exemplary implementation, a connectivity inquiry process includes a control or initiating node requesting the other nodes to report back connectivity to mirrors in the cluster. In one exemplary implementation, the connectivity status inquiry includes a SCSI connectivity inquiry. For example, the control or initiating node can perform a SCSI inquiry for each of the devices it is in communication with.

In block 330B a message is sent to a designated node in the cluster to correct a mirror inconsistency. The designated node selection is based upon the results of the connectivity inquiry process in block 320A. In one embodiment, an initiation or control node sends the message to correct the mirror inconsistency to the designated node. The control or initiation node also specifies in the message the impacted address range of the device and the mirror which should be used to correct the inconsistency. It is appreciated the specified mirror can be selected in a variety of ways (e.g., randomly, based upon results of the connectivity inquiry, etc.).

In block 340B, a read-write-back process is performed by the designated node to correct the mirror inconsistency by reading from the specified mirror at the specified address range and writing to the other mirrors. The mirror consistency correction can be based on read-write-back by a single designated node determined by the connectivity status inquiry. In one exemplary implementation, the results of the correction operation can be communicated back to the control or initiating node along with any failures seen during the correction operation. Forwarding of the correction operation results can act as a confirmation that the designated node was capable of correcting the inconsistencies. If the designated node reports a failure the read-write-back protocol can rerun using a different designated node or mirror to read from. For example, a read-write-back process is repeated utilizing a second specified node if there is a failure response to a read-write-back process utilizing a first specified node.

Figure 4A:
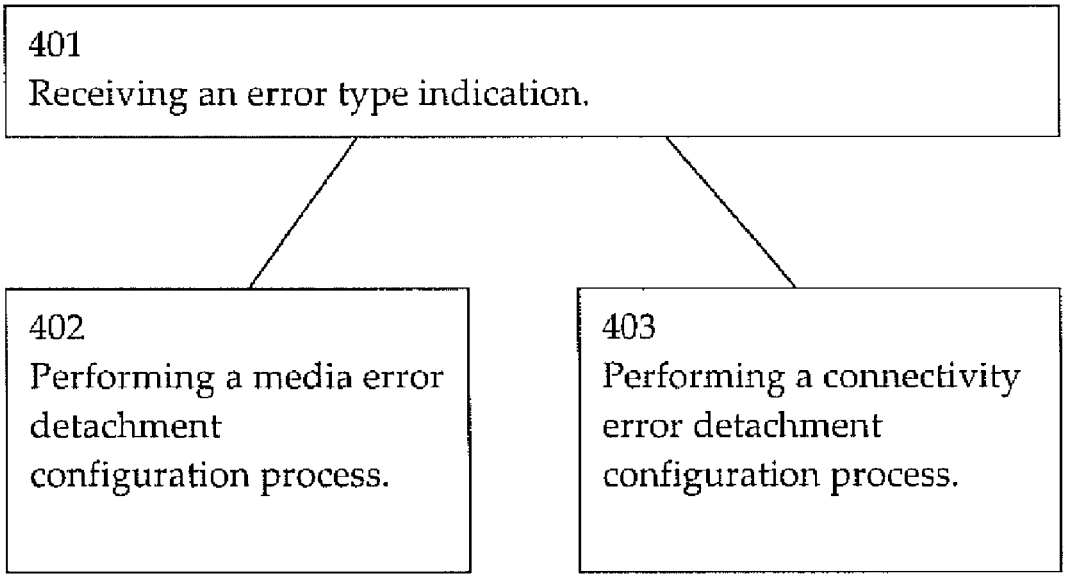
FIG. 4A is a block diagram of an exemplary detachment determination process in accordance with one embodiment of the present invention.

FIG. 4A is a block diagram of a detachment determination process 400 in accordance with one embodiment of the present invention. In one embodiment, detachment determination process 400 is similar to a detachment determination process of block 284.

In block 401, an error type indication is received. In one embodiment the error indication type is received from an error detection process (e.g., an error detection process of block 281, etc.). In one exemplary implementation, if an error involves all of the mirrors a determination is made if any of the mirrors have encountered a media error. If the error is a media error the process proceed to block 402 and if the error is a connectivity error the process proceeds to block 403.

In block 402 a media error detachment configuration process is performed based upon the mirrors that encounter a media error. The media error or failure detachment configuration process can be performed as part of a detachment determination process in block 284. FIG. 4B is a block diagram of exemplary media error detachment configuration process 420 in accordance with one embodiment of the present invention. In block 421 mirrors involved in a media error are determined. In one embodiment, mirrors involved in a media error can be determined based upon checking the I/O status (e.g., error codes, etc.). In block 422, if all mirrors have encountered media errors then all but one of the mirrors is detached. In block 423, if a subset of mirrors have encountered a media error then the mirrors in the subset are detached.

With reference back to FIG. 4A, in block 403 a connectivity error detachment configuration determination process is performed. In one embodiment, the connectivity error detachment configuration determination process determines which mirrors are detached. Following sections include additional descriptions of connectivity error detachment configuration determination processes.

FIG. 4C is a block diagram of exemplary connectivity error detachment configuration determination process 430 in accordance with one embodiment of the present invention. In one embodiment, connectivity error detachment configuration process 430 is similar to a configuration error detachment determination utilized in block 403.

In block 431 consistency maintenance result information is received. The results of both an all node read-write-back consistency maintenance process and an initial connectivity inquiry consistency maintenance process provide an indication of mirror involvement in connectivity errors. In one embodiment, the consistency maintenance results include result information associated with consistency maintenance operations in block 282.

In block 432, a connectivity error mirror involvement process is performed. The mirror error involvement process indicates a mirror's involvement in a connectivity error. In one embodiment, a connectivity error mirror involvement process includes analyzing which mirrors are involved in an error, including if the error involves a subset or all of the mirrors. In one exemplary implementation based upon an all node read-write-back consistency maintenance process (e.g., 300A, etc.) the results indications of which node read-write-back operations were successful and which were failures are analyzed to determine mirror involvement in a consistency error. In an alternate exemplary embodiment based upon an initial connectivity inquiry consistency maintenance process (e.g., 300B. etc.) the results indications of which nodes have connectivity issues based upon the connectivity inquiry are analyzed to determine mirror involvement in a consistency error.

In block 433, a detachment scenario process is performed based upon the results of the connectivity error mirror involvement process of block 432. The detachment scenario process determines which mirrors are not to be detached and which mirrors are to be detached (e.g., as a result of a connectivity error, etc.). In one embodiment, a detachment scenario process efficiently and effectively selects mirrors for detachment.

FIG. 4D is a block diagram of an exemplary detachment scenario process 490 in accordance with one embodiment of the present invention. In block 491, if all mirrors are involved in a connectivity error no mirrors are detached. In block 492, if a subset of mirrors are involved in a connectivity error with respect to all nodes, the subset of mirrors are detached. In block 493, a special subset of all but one mirror is detached. In one exemplary implementation, if a connectivity error for a mirror affects all nodes the mirror is detached as long as one mirror is left. In block 494, if a mirror is involved in a connectivity error with respect to a majority of the nodes, the mirror is detached. In one exemplary implementation, a weighted average is utilized in which different weights are assigned to different nodes.

FIG. 5 is a flow chart of an exemplary connectivity error detachment configuration process 500 in accordance with one embodiment of the present invention. Connectivity error detachment configuration process 500 determines an indication of mirror involvement in a connectivity error based upon all node read-write-back results. In one embodiment, the control or initiator node waits for read-write-back operation (e.g., similar to block 330A, etc.) responses from all other nodes and takes further action based on the responses. The application write can be returned with a failure (e.g., as described in block 313 above) after the appropriate action is done.

In block 510, if at least one node returns a success then no mirrors are detached. In block 520, if all nodes return an error for a subset of mirrors then those mirrors in the subset are detached. In block 530, if all nodes report a failure the read-write-back protocol is rerun using a different mirror to read from. For example, a read-write-back process is repeated utilizing a second specified mirror to read from if all nodes respond with a failure to a read-write-back process utilizing a first specified node. The second specified mirror can be selected (e.g., randomly, based upon connectivity inquiry results, etc.) from remaining mirrors. In block 540, if read-write-back results indicate a mirror is not accessible to any of the nodes the mirror can be detached. In block 550, if nodes have a disjoint set of accessible mirrors, the set of mirrors that are not accessible can also be detached. In one embodiment, a simple majority is utilized. For example, if three out of five nodes can not access a mirror the mirror can be detached. In one exemplary implementation, a weighted average is utilized in which different weights are assigned to different nodes.

Figure 6:
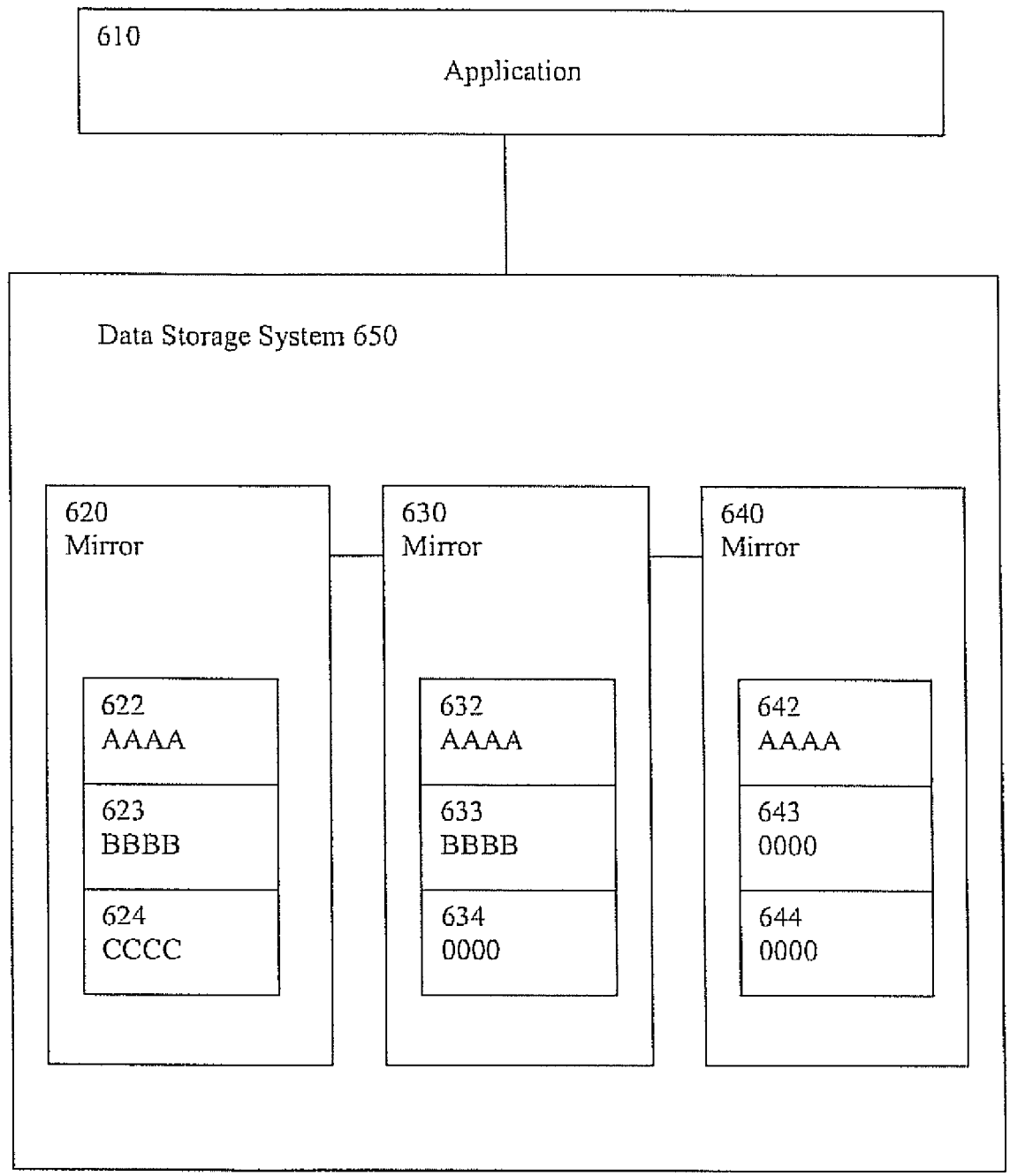
FIG. 6 is a block diagram of an exemplary data storage system in accordance with one embodiment of the present invention.

FIG. 6 is a block diagram of exemplary data storage system 600 in accordance with one embodiment of the present invention. Data storage system 650 includes application 610, mirror 620, mirror 630, and mirror 640. Mirror 620, mirror 630, and mirror 640 are communicatively coupled. The components of exemplary data storage system 650 cooperatively operate to facilitate efficient and convenient storage of data information from application 610. In one embodiment, information stored on one mirror is duplicated or "mirrored" on the other mirrors. It is appreciated that the present systems and methods are readily configurable for implementation in a variety of arrangements or organization.

In one exemplary implementation, information is being written from application 610 to mirror 620. For example, content "AAAA" is written to block 622, content "BBBB" is written to block 623, and content "CCCC" is written to block 624. The other mirrors are not able to store the corresponding information. For example, content "AAAA" is written to block 632, content "BBBB" is written to block 633, but content "CCCC" is not written to block 634. Content "AAAA" is written to block 642, but content "BBBB" is not written to block 643 and content "CCCC" is not written to block 644.

Data storage system 650 begins to handle or adjust for the fault or I/O error. In one embodiment, the system engages in a fault handling method (e.g., similar to fault handling method 310). A detachment determination process (e.g., similar to 400A, 400B, etc.) is performed. In one exemplary implementation, the detachment determination process indicates that the connectivity error involves all of mirrors so none of the mirrors are detached. In one exemplary implementation, the detachment determination process indicates that the connectivity error involves a subset of the mirrors and that subset of mirrors is detached. Consistency and synchronization correction are performed. In one exemplary implementation, a read-write-back operation is utilized.

Figure 7:
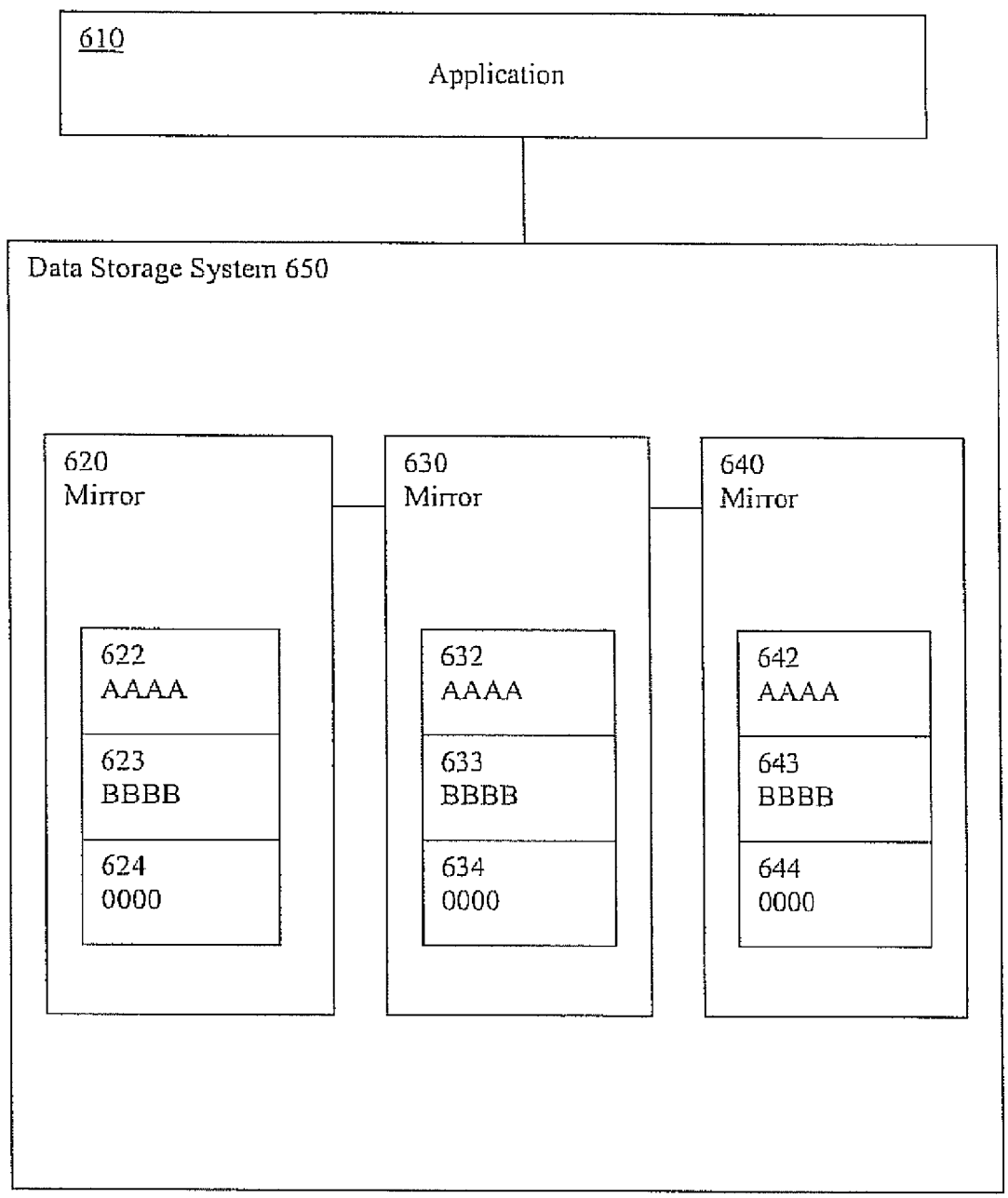
FIG. 7 is a block diagram of an exemplary data storage system after inconsistency resolution in accordance with one embodiment of the present invention.

FIG. 7 is a block is a block diagram of exemplary data storage system 650 after consistency and synchronization correction in accordance with one embodiment of the present invention. The initiator instructs the mirrors to synchronize up with mirror 630. For example, on mirror 620 content "AAAA" is written to block 622, content "BBBB" is written to block 623, and content "0000" is written to block 624. On mirror 630, content "AAAA" is written to block 632, content "BBBB" is written to block 633, and content "0000" is written to block 634. In mirror 640, content "AAAA" is written to block 642, content "BBBB" is written to block 643, and content "0000" is written to block 644.

FIG. 8 is a block diagram of fault handling module 800 which includes instructions for directing a processor in performance of a storage method (e.g., fault handling method 2800, etc.). Fault handling module 800 includes error detection module 810, consistency maintenance module 815, error inconsistency correction module 820, and reporting module 830. Error detection module 810 includes instructions for performing error detection. In one embodiment, error detection module 810 includes instructions for performing error detection as indicated in block 281. Consistency maintenance module 815 includes instructions for performing a process to maintain mirror consistency. In one embodiment, Consistency maintenance module 815 includes instructions for performing mirror consistency maintenance in block 282. Detachment determination module 820 includes instructions for performing a process to establish an appropriate detachment scenario, wherein the appropriate detachment scenario includes not detaching any mirrors if the connectivity error involves all mirrors. In one embodiment, detachment determination module 820 includes instructions for performing detachment determination in block 284. Reporting module 830 includes instructions for reporting a write failure. In one embodiment, reporting module 830 includes instructions for reporting a failure as indicated in block 285.

Figure 9:
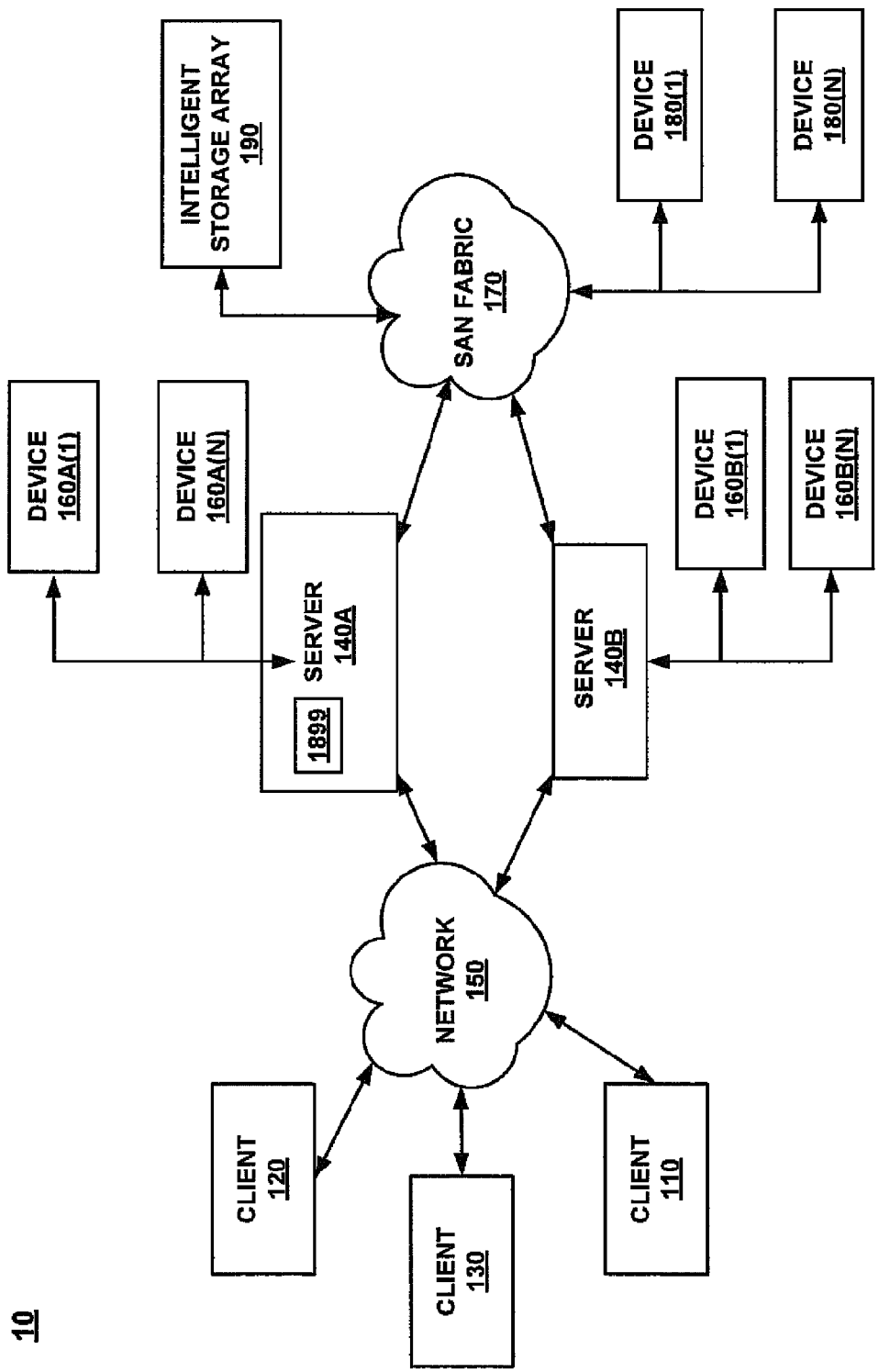
FIG. 9 is a block diagram of an exemplary network architecture in accordance with one embodiment of the present invention.

In one embodiment, a storage method (e.g., fault handling method 310, etc.) can be implemented on a network. FIG. 9 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes fault handling module 1899. In one embodiment, fault handling module 1899 is similar to similar to fault handling module 800. It is appreciated that present systems and methods are compatible with a variety of implementations. For example, portions of information and instructions associated with can be distributed in various resources.

Figure 10:
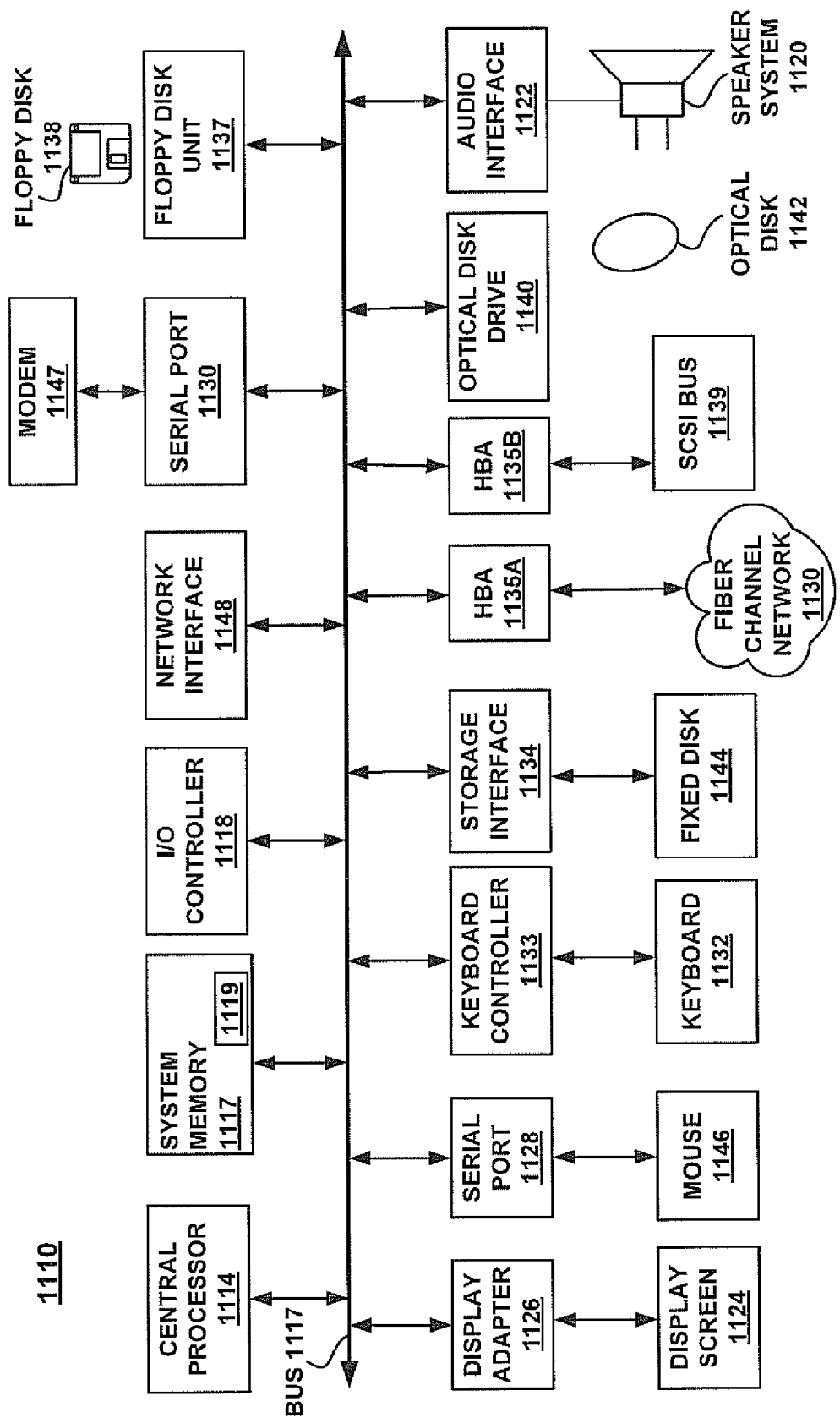
FIG. 10 depicts a block diagram of an exemplary computer system suitable for implementing the present methods in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing a fault handling method (e.g., similar to fault handling method 310, etc.) are stored in one or more memories of computer system 1100 (e.g., in memory location 1119). The RAM is generally the main memory into which the operating system and application programs are loaded. In one embodiment, RAM 1117 includes a reference count update module (e.g., in memory location 1119). In one embodiment, a reference count update module stored in memory location 1119 is similar to fault handling module 1300. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1880(1)-(N) or intelligent storage array 1890. FIG. 9 depicts the use of a network such as the Internet for exchanging data, but the present disclosure is not limited to the Internet or any particular network-based environment.

In one embodiment, detecting utilization of the new systems and methods can be detected by the following steps. Creating a multi-node (say 4 node) shared storage cluster using another product. Then creating RAID1 devices and start I/O load on all nodes. Proceeding to disconnect all storage from one node and observe state of the device mirrors and mirror consistency. If no mirrors get marked as detached and the mirror contents are consistent then it would suggest use of present systems and methods.

Thus, the present systems and methods facilitate efficient and effective data storage and fault or error handling. Present systems and methods can facilitate maintenance of mirror resources with reduced inappropriate detachment while correcting mirror synchronization. The fault handling systems and methods can facilitate improved handling of local storage connectivity issues and faults impacting mirrors of a device in shared storage clusters. Present systems and methods also facilitate resolution of mirror inconsistencies.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A fault handling method comprising:
    performing an error type detection process including determining if an error is a media error or a connectivity error and analyzing if the error includes a subset or all of a plurality of mirrors;
    performing a detachment determination process to establish an appropriate detachment scenario, wherein said appropriate detachment scenario includes:
        detaching all but one of said mirrors if all of said mirrors have encountered media errors; and
        not detaching any mirrors if all of said mirrors have encountered connectivity errors; and
    returning an application write with a failure.

2. The fault handling method of claim 1 wherein said detachment determination process detaches a mirror in accordance with results of read-write-back process.

3. The fault handling method of claim 1 wherein said detachment determination process includes a connectivity status inquiry and mirrors are detached in accordance with results of said connectivity status inquiry.

4. The fault handling method of claim 3 wherein said connectivity status inquiry includes a SCSI connectivity inquiry.

5. The fault handling method of claim 1 wherein consistency and synchronization is maintained between said mirrors by utilizing a read-write-back operation.

6. The fault handling method of claim 1 wherein mirrors not accessible to a majority of nodes are detached.

7. The fault handling method of claim 1 wherein:
    said performing said error type detection process includes if said error involves all of said mirrors determining if any of said mirrors have encountered a media error; and
    said performing a detachment determination process includes identifying for detachment mirrors in a subset of mirrors that have encountered a media error.

8. The fault handling method of claim 1 further comprising transferring a role from a first node to a second node, wherein said first node is impacted by loss of storage access and said second node has sufficient storage access.

9. A non-transitory computer readable storage medium having stored thereon, computer executable instructions that, when executed by a computer system cause the computer system to perform a method comprising:
    performing an error type detection process including determining if an error is a media error or a connectivity error and analyzing if the error includes a subset or all of a plurality of mirrors;
    performing a detachment determination process to establish an appropriate detachment scenario, wherein said appropriate detachment scenario includes:
        detaching all but one of said mirrors if all of said mirrors have encountered media errors; and
        not detaching any mirrors if all of said mirrors have encountered connectivity errors; and
    returning an application write with a failure.

10. The non-transitory computer readable storage medium of claim 9 wherein said detachment determination process detaches a mirror in accordance with results of read-write-back process.

11. The non-transitory computer readable storage medium of claim 9 wherein said detachment determination process includes a connectivity status inquiry and mirrors are detached in accordance with results of said connectivity status inquiry.

12. The non-transitory computer readable storage medium of claim 11 wherein said connectivity status inquiry includes a SCSI connectivity inquiry.

13. The non-transitory computer readable storage medium of claim 9 wherein consistency and synchronization is maintained between said mirrors by utilizing a read-write-back operation.

14. The non-transitory computer readable storage medium claim 9 wherein mirrors not accessible to a majority of nodes are detached.

15. The non-transitory computer readable storage medium of claim 9 wherein:
said performing said error type detection process includes if said error involves all of said mirrors determining if any of said mirrors have encountered a media error; and
said performing a detachment determination process includes identifying for detachment mirrors in a subset of mirrors that have encountered a media error.

16. The non-transitory computer readable storage medium of claim 9 further comprising transferring a role from a first node to a second node, wherein said first node is impacted by loss of storage access and said second node has sufficient storage access.

17. A computer system, comprising:
a computer system having a processor coupled to a computer readable storage media and executing computer readable code which causes the computer system to perform operations including:
performing an error type detection process including determining if an error is a media error or a connectivity error and analyzing if the error includes a subset or all of a plurality of mirrors;
performing a detachment determination process to establish an appropriate detachment scenario, wherein said appropriate detachment scenario includes:
detaching all but one of said mirrors if all of said mirrors have encountered media errors; and
not detaching any mirrors if all of said mirrors have encountered connectivity errors; and
returning an application write with a failure.

18. The computer system of claim 17 wherein said detachment determination process detaches a mirror in accordance with results of read-write-back process.

19. The computer system of claim 17 wherein said detachment determination process includes a connectivity status inquiry and mirrors are detached in accordance with results of said connectivity status inquiry.

20. The computer system of claim 19 wherein said connectivity status inquiry includes a SCSI connectivity inquiry.

21. The computer system of claim 17 wherein consistency and synchronization is maintained between said mirrors by utilizing a read-write-back operation.

22. The computer system of claim 17 wherein mirrors not accessible to a majority of nodes are detached.

23. The computer system of claim 17 wherein:
said performing said error type detection process includes if said error involves all of said mirrors determining if any of said mirrors have encountered a media error; and
said performing a detachment determination process includes identifying for detachment: mirrors in a subset of mirrors that have encountered a media error.

24. The computer system of claim 17 further comprising transferring a role from a first node to a second node, wherein said first node is impacted by loss of storage access and said second node has sufficient storage access.

* * * * *